United States Patent [19]

Eiffler et al.

[11] Patent Number: 5,362,783

[45] Date of Patent: Nov. 8, 1994

[54] STABILIZER COMPOSITION

[75] Inventors: Juergen Eiffler, Stade, Germany; Robin J. Lee, Lake Jackson, Tex.

[73] Assignee: The Dow Chemical Company, Midland, Mich.

[21] Appl. No.: 73,852

[22] Filed: Jun. 8, 1993

[51] Int. Cl.$^5$ ............................................. C08K 5/50
[52] U.S. Cl. .................................... 524/154; 524/291; 524/611
[58] Field of Search ...................... 524/154, 291, 611

[56] References Cited

U.S. PATENT DOCUMENTS

| | | | |
|---|---|---|---|
| 3,255,151 | 6/1966 | Hecker et al. | 524/154 |
| 3,285,855 | 11/1966 | Dexter et al. | 524/291 |
| 4,092,288 | 5/1978 | Calkins et al. | |
| 4,439,570 | 3/1984 | Messina et al. | 524/154 |
| 4,627,949 | 12/1986 | Dhein et al. | |
| 4,670,479 | 6/1987 | Miyauchi | 524/154 |
| 4,722,955 | 2/1988 | Dick | |
| 4,835,202 | 5/1989 | Pastor et al. | 524/154 |

FOREIGN PATENT DOCUMENTS 0269324  6/1988  European Pat. Off. .
1357937  3/1964  France .

OTHER PUBLICATIONS

Ullmann's Encyclopedia of Industrial Chemistry, vol. A3, pp. 91 et seq., 1985, VCH Verlagsgesellschaft mbH, D-6940 Weinheim (Federal Republic of Germany).
Encyclopedia of Polymer Science and Engineering, vol. 2, pp. 73 et seq., 1985, John Wiley & Sons, Inc.

Primary Examiner—Veronica P. Hoke

[57] ABSTRACT

A stabilizer composition contains a) a phosphine of the general formula $$PR^1R^2R^3 \quad (I)$$

wherein $R^1$, $R^2$, and $R^3$ independently from each other represent an alkyl, cycloalkyl, aryl or alkyl-aryl group or an aryl group which is substituted at the aromatic ring with one or more halogens and/or one or more alkyl, hydroxy or alkoxy groups and b) a hindered phenol.

The stabilizer composition is useful for stabilizing thermoplastic polymers against discoloration. Optionally an organic light diffuser mixed with the thermoplastic polymer. The stabilizer composition is particularly useful for stabilizing polycarbonate compositions.

17 Claims, No Drawings

STABILIZER COMPOSITION

BACKGROUND OF THE INVENTION

The present invention relates to a stabilizer composition which is useful for stabilizing a thermoplastic polymer against discoloration, to a polymer composition containing a thermoplastic polymer and the stabilizer composition and to shaped articles produced from the polymer composition.

It is generally known in the art that most of the known thermoplastic polymers are affected to a certain extent when they are exposed to heat, humidity and/or UV radiation. The deterioration of the polymers by heat and/or UV radiation often results in yellowing of the polymer and in degradation of its molar mass. Therefore, it is common to treat thermoplastic polymers with stabilizers. A large variety of stabilizers has been suggested in the prior art for the various thermoplastic polymers. For example it has been suggested to utilize certain organic phosphites, phosphonites or phosphines, optionally in combination with epoxides or polydialkylsiloxanes, for stabilizing polycarbonates against thermal or thermal-oxidative degradation. The stabilization of polycarbonates by means of phosphines is for example known from U.S. Pat. No. 4,092,288 and from U.S. Pat. No. 4,627,949. U.S. Pat. No. 4,627,949 discloses that shaped polycarbonate articles which have been stabilized by means of phosphines are useful in all cases where the shaped articles are exposed to high temperatures for a relatively long time, and in addition for all articles for which a high transparency is required, especially in the light field, for example for lamp covers or glazing with polycarbonate sheets.

Furthermore, it is known that polycarbonate hydrolyzes when it is contacted with boiling water. The hydrolysis of the polycarbonate is accelerated in the presence of thermostabilizers, such as phosphites or phosphonites. Epoxides or organic silicon compounds are known to stabilize polycarbonate against hydrolyric degradation.

It is also known that the influence of UV light, particularly in combination with oxygen and humidity, attacks polycarbonate by photooxidation. Benzotriazole and benzophenone systems as well as acrylic acid esters and malonic acid derivatives have been suggested as UV stabilizers.

U.S. Pat. No. 4,722,955 discloses carbonate polymer compositions which comprise a carbonate polymer, a heat stabilizing phosphorous compound, an epoxy compound containing internal acyclic ether linkages and optionally a hindered phenol. The phosphorous compound is an organo-phosphine, an organophospate or, preferably, an organo-phosphonite or an organo-phosphite. Although these carbonate polymer compositions have good optical properties and improved optical stability, as compared to other known carbonate polymer compositions, the color stability of these compositions at very high temperature, e.g. at 280° C. or more, is still not as great as would be desirable.

Although a wide variety of stabilizers exist for the various types of thermoplastic polymers, it is still desirable to provide new stabilizers in order to meet the ever increasing quality requirements for thermoplastic polymers.

SUMMARY OF THE INVENTION

One aspect of the present invention relates to an essentially epoxide-free stabilizer composition which contains a) a phosphine of the general formula $$PR^1R^2R^3 \qquad (I)$$

wherein $R^1$, $R^2$ and $R^3$ independently from each other represent an alkyl, cycloalkyl, aryl or arylalkyl group or an aryl group which is substituted at the aromatic ring with one or more halogens and/or one or more alkyl, hydroxy or alkoxy groups and b) a hindered phenol.

Another aspect of the present invention relates to the use of the stabilizer composition of the present invention for stabilizing a thermoplastic polymer against discoloration.

Yet another aspect of the present invention relates to a method of stabilizing a thermoplastic polymer against discoloration by blending an effective amount of the stabilizer composition of the present invention with the thermoplastic polymer and optionally processing the blend into pellets or granules and/or into a shaped article.

Yet another aspect of the present invention is a polymer composition which contains a thermoplastic polymer and the stabilizer composition of the present invention.

Yet another aspect of the present invention is a shaped article which has been produced from the polymer composition of the present invention.

Surprisingly, it has been found that the combination of a phosphine a) and a hindered phenol b) is unexpectedly more effective for stabilizing a thermoplastic polymer against discoloration than the phosphine a) alone or the phenol b) alone. The increased color stability of a thermoplastic polymer provided by the synergistic effect of the two components of the stabilizer composition becomes apparent by comparing the Yellowness Index of various thermoplastic polymer compositions after exposure to heat. Generally, a thermoplastic polymer composition containing a combination of a phosphine a) and a hindered phenol b) shows considerably less yellowness due to discoloration than a comparable polymer composition containing either a phosphine a) alone or a hindered phenol b) alone. Surprisingly, it has also been found that the stabilizer composition of the present invention is very efficient even in the absence of an essential amount of an epoxide, such as an epoxy compound disclosed in U.S. Pat. No. 4,722,955. As taught in U.S. Pat. No. 4,722,955 an epoxy compound does increase the stabilizing effect of a phosphonite or a phosphite. However, contrary to the teaching in U.S. Pat. No. 4,722,955 it has been surprisingly found that the combination of a phosphine of formula (I) and a hindered phenol is at least equally efficient and generally even more efficient in providing color stability to a thermoplastic polymer at high temperature than the combination of a phosphine of formula (I), a hindered phenol and an epoxy compound.

DETAILED DESCRIPTION OF THE INVENTION

The stabilizer composition of the present invention contains a) a phosphine of the general formula $$PR^1R^2R^2 \quad (I),$$

wherein $R^1$, $R^2$ and $R^3$ independently from each other represent an alkyl, cycloalkyl, aryl or arylalkyl group or an aryl group which is substituted at the aromatic ring with one or more halogens and/or one or more alkyl, hydroxy or alkoxy groups.

The radicals $R^1$, $R^2$ and $R^3$ can be identical or different.

Of the alkyl groups those are preferred that have 1 to 18, preferably 1 to 12 carbon atoms, such as methyl, ethyl, n-propyl, i-propyl, n-butyl, sec. butyl or tert. butyl or the pentyl, hexyl, octyl, nonyl, decyl or octadecyl groups. The alkyl groups can be straight-chain or branched.

Of the cycloalkyl groups those having 5 or 6 carbon atoms, such as cyclopentyl or cyclohexyl are preferred.

Of the aryl groups those having from 6 to 14 carbon atoms, such as phenyl or naphthyl, are preferred. The aryl groups may be substituted with one or more of the above-mentioned alkyl groups and/or with one or more halogens, such as fluoride, chloride or bromide, and/or one or more hydroxy groups and/or one or more alkoxy groups. Alkoxy groups, if present, preferably contain 1 to 6 carbon atoms, such as the methoxy, ethoxy, n-propoxy, i-propoxy, n-butoxyl, sec. butoxyl or tert. butoxyl groups. If substituted, the aryl groups preferably are substituted with 1, 2 or 3 substituent groups.

In the aryl-alkyl groups the above-mentioned alkyl groups are preferred and the aryl group preferably is phenyl. Preferred aryl-alkyl groups are benzyl, butyl phenyl or tolyl. Preferred phosphines of formula (I) are triethyl phosphine, tributylphosphine, tripropyl phosphine, triamyl phosphine, trioctyl phosphine, dimethyl phenyl phosphine, dibutyl phenyl phosphine, diphenyl methyl phosphine, diphenyl butyl phosphine, diphenyl octyl phosphine, diphenyl octadecyl phosphine, triphenyl phosphine, tri(butyl phenyl) phosphine, tri-p-tolyl phosphine, tri(p-nonylphenyl) phosphine, trinaphthylphosphine, tri(p-chlorophenyl) phosphine, tri(p-flourophenyl)phosphine, diphenylbenzylphosphine, diphenyl-(p-hydroxyphenyl) phosphine, diphenyl-1,4-dihydroxyphenyl-2-phosphine and phenyl naphthyl benzyl phosphine. Triphenyl phosphine is the most preferred compound of formula (I).

The stabilizer composition of the present invention can contain one or more of the phosphines of formula (I). The phosphines of formula (I) and methods of preparing them are known in the art.

The stabilizer composition also contains one or more hindered phenols. The expression "hindered phenol" is generally known in the art. It is well known that hindered phenols are useful antioxidants for various polymers, such as chlorinated polyethylene, PVC and polystyrene. Hindered phenols and their use as antioxidants are described in Ullmann's Encyclopedia of Industrial Chemistry, Vol. 3, "Antioxidants", pages 95-98, 5th ed., 1985, VCH Verlagsgesellschaft mbH and in the Encyclopedia of Polymer Science and Engineering, Vol. 2, "Antioxidants", pages 75-91, 1985 by John Wiley & Sons, Inc. Methods of preparing the hindered phenols are also well known in the art.

Preferred hindered phenols are those of formula

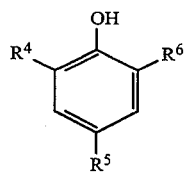

wherein $R^4$, $R^5$ and $R^6$ each independently are a $C_{1-6}$-alkyl group, a $C_{1-3}$-hydroxyalkyl group, or a $C_{1-3}$-alkoxy group such as methyl, ethyl, n-propyl, i-propyl, n-butyl, i-butyl, tert-butyl, a pentyl or a hexyl group, a hydroxymethyl, hydroxyethyl or hydroxypropyl group or a methoxy, ethoxy or propoxyl group.

Generally at least one, preferably at least two groups should provide steric hindrance to the molecule of formula II. Preferably at least one, more preferably at least two of the groups $R^4$, $R^5$ and $R^6$ are i-butyl or tert-butyl. Preferred examples of hindered phenols of formula II are 2,6-di-tert-butyl-4-methylphenol, 2,6-di-tert-butyl-4-sec-butylphenol, 4-(hydroxymethyl)-2,6-di-tert-butylphenol or 2,6-di-tert-butyl-4-methoxyphenol.

Other preferred hindered phenols are those of formula III

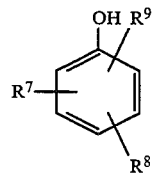

wherein $R^7$, $R^8$ and $R^9$ are arranged in the ortho and para positions to the hydroxyl group, $R^7$ is a $C_{1-6}$-alkyl group, $R^8$ is a $C_{1-6}$-alkyl group or a group containing one or more ester, ether, amide, amine, phosphonite, phosphonate, thioester and/or thioether functionalities and containing up to 24, preferably up to 12 carbon atoms, such as the $-CH_2-CH_2-C(O)-O-C_{18}H_{37}$ group or the $-CH_2-S-C_8H_{17}$ group and $R^9$ is a group containing one or more ester, ether, amide, amine, phosphonite, phosphonate, thioester and/or thioether functionalities and containing up to 24, preferably up to 12 carbon atoms, such as the $-CH_2-CH_2-C(O)-O-C_{18}H_{37}$ group or the $-CH_2-S-C_8H_{17}$ group.

When $R^7$ or $R^8$ or both are a $C_{1-6}$-alkyl group, they preferably are methyl, ethyl, n-propyl, i-propyl, n-butyl, i-butyl, tert-butyl, a pentyl or a hexyl group.

Preferred examples of hindered phenols of formula III are octadecyl 3,5-di-tert-butyl-4-hydroxyhydrocinnamate, commercially available as IRGANOX 1076 (trademark), 2-methyl-4,6-bis((octylthio)methyl)-phenol, commercially available as IRGANOX 1520 (trademark), 2,6-di-tert-butyl-4(dimethylaminomethyl)-phenol or 3,5-di-tert-butyl-4-hydroxybenzyl di-O-ethyl phosphonate, commercially available as IRGANOX 1222.

Other preferred hindered phenols contain 2 phenolic groups, for example those of formula IV

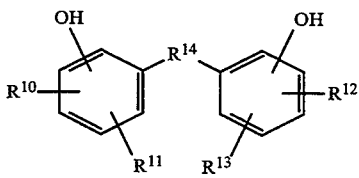

wherein $R^{10}$, $R^{11}$, $R^{12}$ and $R^{13}$ each independently are a $C_{1-6}$-alkyl group, such as methyl, ethyl, n-propyl, i-propyl, n-butyl, i-butyl, tert-butyl, a pentyl or a hexyl group and $R^{14}$ is a straight or branched alkylene group having 1-12, preferably 1-6, more preferably 1-4 carbon atoms, such as methylene, ethylidene or butylidene, or a divalent group containing one or more ester, ether, amide, amine, phosphonite, phosphonate, thio-ester and/or thioether functionalities and containing up to 18, preferably up to 12 carbon atoms, such as the groups —$CH_2$—$CH_2$—$C(O)$—$O$—$CH_2$—$CH_2$—$O$—$CH_2$—$CH_2$—$O$— $CH_2$—$CH_2$—$O$—$C(O)$—$CH_2$—$CH_2$— or —$CH_2$—$CH_2$—$C(O)$—$O$—$(CH_2$—$)_6$—$O$—$C(O)$—$CH_2$—$CH_2$— or $CH_2$—$CH_2$—$C(O)$—$NH$—$(CH_2$—$)_6$—$NH$—$C(O)$—$CH_2$—$CH_2$— or —$CH_2$—$CH_2$—$C(O)$—$NH$—$NH$—$C(O)$—$CH_2$—$CH_2$—.

Generally at least two, preferably four of the groups $R^{10}$, $R^{11}$, $R^{12}$ and $R^{13}$ should provide steric hindrace to the molecule of formula IV. Preferably at least one, more preferably at least two of the groups $R^{10}$, $R^{11}$, $R^{12}$ and $R^{13}$ are i-butyl or tert-butyl. Preferred hindered phenols of formula IV are 2,2'-ethylidenebis-(4,6-di-tert-butylphenol), 2,2'-methylenebis(4-ethyl-6-tert-butylphenol), 2,2'methylenebis(4-methyl-6-tert-butylphenol), 2,2'methylenebis[4-methyl-6-(1-methylcyclohexyl)]phenol, 4,4'-butylidenebis(6-tert-butyl-3-methylphenol), 4,4'methylenebis(2,6-di-tert-butylphenol), N,N'-1,6-hexamethylene-bis-3-(3,5-di-tert-butyl-4-hydroxyphenyl)propionamide, commercially available as IRGANOX 1098 (trademark), 1,6-hexamethylene bis(3,5-di-tert-butyl-4-hydroxyhydrocinnamate, commercially available as IRGANOX 259 (trademark), triethylene glycol bis[3-(3-tert-butyl-4-hydroxy-5-methylphenyl)]propionate, commercially available as IRGANOX 245 (trademark), N,N'-bis(3,5-di-tert-butyl-4-hydroxyhydrocinnamoyl)hydrazine, commercially available as IRGANOX MD 1024 and nickel or calcium bis[O-ethyl(3,5-di-tert-butyl-4-hydroxybenzyl)phosphonate, the latter being commercially available as IRGANOX 1425.

Other preferred hindered phenols are those of formula V

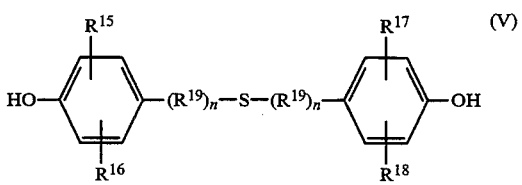

wherein $R^{15}$, $R^{16}$, $R^{17}$ and $R^{18}$ each independently are a $C_{1-6}$-alkyl group, such as methyl, ethyl, n-propyl, i-propyl, n-butyl, i-butyl, tert-butyl, a pentyl or a hexyl group and $R^{19}$ is a straight or branched alkylene group having 1-12, preferably 1-6, more preferably 1-4 carbon atoms, such as methylene, ethylidene or butylidene, or a divalent group containing one or more ester, ether, thioether, amide and/or amine functionalities and containing up to 18, preferably up to 12 carbon atoms, such as the group —$CH_2$—$CH_2$—$C(O)$—$O$—$CH_2$—$CH_2$—$CH_2$—$CH_2$—$O$—$C(O)$—$CH_2$—$CH_2$— and n is 0 or 1.

Generally at least two, preferably four of the groups $R^{15}$, $R^{16}$, $R^{17}$ and $R^{18}$ should provide steric hindrance to the molecule of formula V. Preferably at least one, more preferably at least two of the groups $R^{15}$, $R^{16}$, $R^{17}$ and $R^{18}$ are i-butyl or tert-butyl. Preferred hindered bisphenols are 4,4'-thiobis(6-tert-butyl-3-methylphenol) or thiodiethylenebis(3,5-di-tert-butyl-4-hydroxy)hydrocinnamate, commercially available as IRGANOX 1035 (trademark).

Other preferred hindered phenols are hindered polyphenols, such as tetrakis[methylene(3,5-di-tert-butyl-4-hydroxyhydrocinnamate)]methane, commercially available as IRGANOX 1010, 1,3,5-trimethyl-2,4,6-tris(3',5'-di-tert-butyl-4'-hydroxybenzyl) benzene, commercially available as IRGANOX 1330, 1,3,5-tris(3,5-di-tert-butyl-4-hydroxybenzyl)isocyanurate, 1,1,3tris(5-tert-butyl-4-hydroxy-2-methylphenyl)butane; 1,1,5,5-tetra-(5-tert-butyl-4-hydroxy-2methylphenyl)pentane; or ethylene glycol-bis-[3,3-bis(3'-tert-butyl-4'-hydroxyphenyl)-butyrate]; hydroxybenzyl compounds such as 2,2-bis-(3,5-di-tert-butyl-4-hydroxybenzyl)-malonic acid-dioctadecyl ester: esters of beta-(3,5-di-tert-butyl-4-hydroxyphenyl) propionic acid with alcohols such as octadecanol or pentaerythritol; spiro compounds such as 3,9-bis-(3,5-di-tert-butyl-4-hydroxyphenyl)-2,4,8,10-tetra-oxaspiro[5,5]-undecane.

The hindered phenol may be blended with an organo-phosphite, preferably with a phosphite of formula (VI)

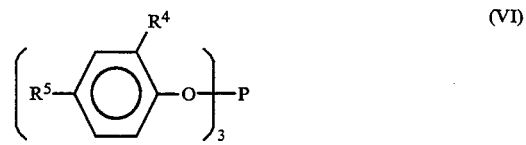

wherein $R^4$ and $R^5$ each independently have the meanings indicated above for $R^4$ and $R^5$ in formula (II). The weight ratio between the hindered phenol and the organo-phoshite preferably is from 1:4 to 4:1, more preferably 2:1 to 1:2, most preferably about 1:1. The blend of the hindered phenol and the organo-phosphite is used in combination with a phosphine of formula (I).

In the practice of the present invention the most preferred hindered phenols are tetrakis[methylene(3,5-di-tert-butyl-4-hydroxyhydrocinnamate)]methane, commercially available as IRGANOX 1010, 3,5-di-tert-butyl-4-hydroxyhydrocinnamate, commercially available as IRGANOX 1076 (trademark) or a 1:1 blend of IRGANOX 1010 and tri(2,4-di-tert-butyl-phenyl)-phosphite (IRGAPHOS 168, trademark), which blend is commercially available as IRGANOX B 225.

Generally the stabilizer composition of the present invention contains the phosphine a) and the hindered phenol b) in a weight ratio of from 0.1:1 to 10:1, preferably from 0.2:1 to 5:1, more preferably from 0.25:1 to 2:1, most preferably from 0.3:1 to 1:1.

The stabilizer composition of the present invention is essentially epoxide-free. This means that it contains, if present at all, less than 75 ppm, preferably less than 50 ppm and more preferably less than 10 ppm of an epoxy compound. Most preferably it does not contain any measurable amount of an epoxy compound.

The stabilizer composition of the present invention can be prepared by blending the phosphine a) and the hindered phenol b) in a known manner. The blending temperature is not critical. Room temperature is the most convenient one, however, decreased or elevated temperatures are also useful.

The stabilizer composition of the present invention is very useful for stabilizing thermoplastic polymers against discoloration. Accordingly, another aspect of the present invention is a polymer composition which contains one or more thermoplastic polymers and the above described stabilizer composition of the present invention. The thermoplastic polymer preferably is a polyolefin, such as an ethylene-homo- or -copolymer or a polypropylene, a polyacrylate or polymethacrylate or a styrene-homo- or -copolymer, such as polystyrene, a styrene/acrylate copolymer, a copolymer of styrene, butadiene and an acrylate, such as methyl methacrylate (an MBS polymer), a polycarbonate or a blend of such polymers. The stabilizer composition of the present invention is particularly useful for stabilizing a polycarbonate which is optionally blended with an ABS (acrylonitrile/butadiene/sysrene) polymer, a polyalkyleneterephthalate, such as polyethyleneterephthalate, a polystyrene, a polyarylene-sulphone or with a polyolefin. Preferred polyolefins are polyethylene or ethylene copolymers, such as ethylene/propylene copolymers, ethylene/acrylate copolymers, polypropylene, polybutene, polyisobutene or polymethylpentene. These polymers are well known in the art.

For the sake of convenience in the following paragraphs mainly polymer compositions are described which contain a polycarbonate as a thermoplastic polymer, although the present invention is not limited thereto. Suitable polycarbonates are described in U.S. Pat. No. 4,722,955, column 2, lines 6-42 and the references cited therein. The thermoplastic polycarbonates present in the polymer compositions of the present invention generally are polycondensates which are obtainable by reacting diphenols, such as Bisphenol A and/or bishydroxyphenylfluorene, with phosgene or diesters of carbonic acid, dihydroxydiarylalkanes, the aryl radicals of which carry methyl groups or halogen atoms in the o- and/or m-position relative to the hydroxyl groups also being suitable, in addition to unsubstituted dihydroxydiarylalkanes. Examples of suitable diphenols which are useful as starting materials for the polycarbonates are listed in U.S. Pat. No. 4,627,949, column 2, line 68 - column 3, lines 1-22. Most preferably, the polycarbonate is prepared from Bisphenol A and phosgene. The polymer composition of the present invention preferably contains an aromatic, transparent polycarbonate.

Polycarbonates and methods of producing them are well known in the art. For example the polycarbonate can be prepared by a known interfacial two phase process, a homogeneous organic solution process and/or a melt process. U.S. Pat. No. 4,092,288 discloses aromatic polycarbonates and methods of preparing them in column 4, lines 4-68 and in Example 1. Alternatively, polycarbonates can be prepared from diphenylcarbonate or dimethyl carbonate by transesterification.

Branched polycarbonates are also suitable. If the polycarbonate is branched, it preferably contains from 0.01 to 3%, more preferably from 0.05 to 2% of a branching agent, by the weight of the polycarbonate. Branched polycarbonates, methods of preparing them and suitable branching agents are for example described in U.S. Pat. No. 3,544,514, the published European patent application EP-A-0,411,433 and in the references cited in EP-A-0,411,433. A preferred branching agent is 1,1,1-tris(4 hydroxyphenyl)ethane.

The polycarbonates preferably have a number average molecular weight of from 10,000 to 200,000, more preferably from 15,000 to 100,000 and most preferably from 17,000 to 45,000.

The end groups of the polycarbonate may be the same or different. The most preferred end groups are p-tert-butyl phenyl, p-octyl phenyl, or phenyl. End groups which can lead to a crosslinking of polycarbonate such as arylcyclobutene terminated carbonate polymers are particularly useful. The invention is not restricted to these examples.

The polymer composition of the present invention preferably contains from 0.001 to 2 wt.-%, more preferably from 0.01 to 0.5 wt.-%, most preferably from 0.02 to 0.1 wt.-% of a phosphine a) and preferably from 0.001 to 2 wt.-%, more preferably from 0.05 to 0.5 wt.-%, most preferably from 0.1 to 0.3 wt.-% of a hindered phenol b), by the weight of the thermoplastic polymer.

The stabilizer composition of the present invention is particularly efficient when the polymer composition of the present invention contains a light diffuser, preferably an organic light diffuser. Light diffusers are generally used for introducing light-scattering properties into transparent polymers. Light diffusers are frequently compounded into thermoplastic polymers, such as polymethacrylates, poly(methacrylic acid esters), polycarbonates, polystyrenes, poly(vinyl chlorides), poly(vinyl acetates), poly(methyl methacrylate-co-alkyl acrylates), etc. Polymer compositions containing light diffusers are widely used in the electrical and lightening industry, for example as luminaries, rear projection screens for television etc. Unfortunately, many of the known light diffusers are sensitive towards heat and/or oxygen. When the light diffuser is compounded into the thermoplastic polymer at a high processing temperature or when the blend of the light diffuser and the thermoplastic polymer is processed to a shaped article at a high temperature often discolored products are obtained and an increase of the polymer melt flow rate, i.e. polymer degradation is observed. This results in a decrease of the mechanical stability of the products.

Surprisingly, it has been found that the above described combination of a phosphine a) and a hindered phenol b) is very efficient for stabilizing a thermoplastic polymer against discoloration, even when a light diffuser has been compounded into the polymer.

If present, the polymer composition generally contains a light diffuser in an amount of from 0.1 to 10 wt.-%, preferably from 0.2 to 5 wt.-%, more preferably from 0.5 to 3 wt.-%, by the weight of the thermoplastic polymer, such as polycarbonate.

The polymer composition preferably contains an organic light diffuser, more preferably a cross-linked homo- or copolymer. Exemplary of useful known light diffusers are spherical cross-linked copolymers of 1-90 wt.-% of cyclohexylmaleimide and 99-10 wt.-% of styrene having an average diameter of 4-100 microns. Another useful known light diffuser is a poly(methyl methacrylate) resin having an average diameter of 0.5–100 micron, preferably 1–20 micron.

The most preferred light diffusers in the polymer compositions of the present invention are cross-linked homo- or copolymers which contain at least 15 wt.-%, preferably from 20 to 80 wt.-%, more preferably from 25 to 60 wt.-% of a polymerized, optionally alkylated acrylate. If the optionally alkylated acrylate is copolymerized, one or more of the following monomers are preferred for copolymerization: vinyl arenes, such as styrene or an alkyl styrene like methylstyrene or ethyl styrene; olefins, such as butadiene; acrylonitrile or maleimide. Two or more optionally alkylated acrylates can be copolymerized. If alkylated, the acrylate preferably contains a $C_{1-8}$ alkyl group, more preferably a $C_{2-8}$-alkyl group. The preferred alkyl acrylates are methyl acrylate, ethyl acrylate and butyl acrylate.

Such organic light diffusers and methods of preparing them are generally known. For example, German Offenlegungsschrift 21 46 607 discloses that spherical cross-linked acrylates having a particle size from 0,5 to 30 micron are dispersed in a continuous phase of a soluble, uncross-linked polymer, e.g. derived from acrylics, styrene, vinylchloride, or vinyl acetate.

Most preferably, an organic light diffuser known from the published European patent application 0,269,324 is incorporated into the polymer composition of the present invention. This light diffuser comprises particles of a core/shell morphology which have an average diameter of from 2 to 15 micron, a particle size distribution such that at least 90% by weight of the particles fall within ±20% of the average particle diameter, a core of rubbery alkyl acrylate polymer, the alkyl group having from 2 to 8 carbon atoms, copolymerized with 0 or up to 5% cross-linker and 0 or up to 5% graft-linker (based on the total weight of the core), and one or more polymer shells. The shells comprise from 5 to 40% of the weight of the particles. The rubbery alkyl acrylate polymer preferably is a copolymer of an alkyl acrylate and up to 50% of one or more copolymerizable vinyl monomers, preferably a monovinyl monomer, such as an alkyl methacrylate and/or a vinyl arene, such as styrene. All the shells or only the outer most shell are preferably a polymer of an alkyl methacrylate, a vinyl arene, a vinyl carboxylate and/or an alkyl acrylate. Further details on the light diffuser comprising particles of a core/shell morphology and methods of preparation are disclosed in European patent application 0,269,324 the teaching of which is incorporated herein by reference.

The average particle diameter of the organic light diffuser generally is from 0.1 to 100 microns, preferably from 1 to 15 microns. The particles are preferably of spherical shape.

The polymer composition of the present invention may contain optional additives, such as optical brighteners or fluorescenting dyestuffs, pigments or colorants, tackifiers, mold release agents, impact modifiers, fillers etc. Such optional additives are generally known in the art. If present, the polymer composition of the present invention contains an optical brightener or a fluorescenting dye preferably in an amount of from 0.01 to 3 wt.-%. The amount of pigments or colorants preferably is from 0.0001 to 5 wt.-%, if present at all. Preferred mold release agents are known esters of long fatty acids; their preferred amount is from 0.01 to 2 wt.-%. All percentages are based on the weight of the thermoplastic polymer in the polymer composition. The polymer composition of the present invention may contain other anti-oxidants and/or UV stabilizers, such as phosphites, hypophosphites, phosphonites etc., which may have been added during the production of the thermoplastic polymer or during the production of the organic light diffuser. Preferred phosphites are those of formula VI above.

For preparing the polymer composition of the present invention an effective amount of the phosphine a) and the hindered phenol b) are mixed with the thermoplastic polymer. The phosphine a) and the hindered phenol b) may be premixed before blending the mixture with the thermoplastic polymer. Alternatively the phosphine a) and the hindered phenol b) may be mixed separately with the thermoplastic polymer. The phosphine a) and the hindered phenol b) may be added simultaneously or in sequence to the thermoplastic polymer. If added in sequence, first the phosphine b) and then the hindered phenol b) may be added or vice versa. One or more optional additives, such as an above-described light diffuser etc, may be mixed with the thermoplastic polymer prior to, simultaneously with or after the addition of the phosphine a) and the hindered phenol b). The mixing temperature is not very critical. Room temperature is the most convenient one, however, decreased or elevated temperatures are also useful, However, it is advisable to mix the phosphine a) and the hindered phenol b) with the thermoplastic polymer, which may contain optional additives such as a light-diffuser etc., before the thermoplastic polymer is processed to granules or pellets. Most preferably, the phophine a) and the hindered phenol b) are admixed before the thermoplastic polymer is subjected to any processing or compounding step at elevated temperature. The manner of dispersing or mixing the phosphine(s) a), the hindered phenol(s) b) and any optional additives with the thermoplastic polymer(s) is not critical. However, the process chosen should be one which results in a great degree of dispersion of all the additives throughout the thermoplastic polymer. Preferred mixing equipment are mixing rolls, ribbon blenders, dough mixers, Banbury mixers, etc. The mixture can then be processed to granules or pellets by known extrusion techniques. The mixture may be fed into an extruder and extruded to a strand which is then granulated into pellets or granules. A preferred method is a devolatilizing extrusion process as generally described in U.S. Pat. No. 4,627,949. If the polymer composition contains polycarbonate, the extrusion is preferably conducted at a temperature of from 200° to 390° C., more preferably from 230° to 380° C., most preferably from 260° to 370° C.

The pellets or granules may be formed into shaped articles in a generally known manner, for example by compression molding, injection-molding, casting techniques, etc. A preferred processing method is a devolatilizing injection-molding as generally described in U.S. Pat. No. 4,627,949. If the polymer composition contains polycarbonate, the injection-molding is preferably conducted at a temperature of from 200° to 380° C., more preferably from 230° to 370° C., most preferably from 260° to 370° C. Examples of shaped articles are sheets, lamp covers, etc.

The yellowness index of shaped articles of the present invention is preferably only up to about 90%, more preferably only up to about 85%, most preferably only up to about 80% of the yellowness index of a known comparable shaped article which contains either only phosphine of formula (I), or only a hindered phenol or a combination of a phosphine, a hindered phenol and an epoxy compound.

The invention is further illustrated by the following examples which should not be construed to limit the scope of the present invention. Unless otherwise mentioned all parts and percentages are weight parts and weight percentages.

Examples 1 to 4 and Comparative Examples A to H

The following components are used for producing the compositions of these examples:

Polycarbonate Composition: In all examples a dried polycarbonate prepared by interfacial polycondensation of bisphenol A and phosgene is used. The polycarbonate has a melt flow rate of 3.8. In addition to polycarbonate the composition contains 1000 ppm of Cetiol (trademark) as a tackifier, 3500 ppm of Tinuvin 234 (trademark) as a UV stabilizer, 1150 ppm of Uvitex (Trademark) as an optical brightener and 1% of a light diffuser specified below. All amounts of the additives are based on the weight of the polycarbonate.

Phosphine a): Triphenylphosphine (TPI);

Hindered phenol b):

Octadecyl 3,5-di-tert-butyl-4-hydroxyhydrocinnamate, commercially available as IRGANOX 1076 (trademark); (under another nomenclature this compound may be named stearyl 3(3′, 5′-di-tert.butyl-4-hydroxyphenyl)propionate).

PEPQ: Tetrakis-(2,4-di-tert-butylphenyl) biphenylenediphosphonite, commercially available as Irgaphos-PEPQ (trademark), is used for comparative purposes. It is known that this compound is useful for stabilizing polycarbonate against thermal degradation and discoloration.

Light diffuser I: a polymer having a core of poly(butyl acrylate) and a shell of poly(methyl acrylate). The polymer is commercially available from Rohm and Haas under the trademark Paraloid EXL 5137.

Light diffuser II: a cross-linked poly(methyl methacrylate) containing 6% cross-linking agent and having an average particle diameter of 8 micron. The polymer is commercially available from Sekisui Plastics under the trademark MBX K-8. When light diffuser II is utilized, additionally 150 ppm of titanium dioxide is incorporated into the polycarbonate composition.

Light diffuser III: a two phase acrylate/styrene polymer. The polymer is generally used as a matting agent and is commercially available from Degussa under the trademark Degussa OP 278.

In all Examples and Comparative Examples the above-mentioned polycarbonate composition is mixed with the stabilizer or the stabilizer composition and in amounts listed in the tables below. The listed ppm are based on the weight of polycarbonate. The mixture is extruded to pellets at a temperature of 365° C. The extrusion is carried out under vented conditions (300 rpm, 60–70% torque). The melt flow rate of the pellets after extrusion is measured. The pellets are injection molded at 300° C. into plaques of 3.2 mm thickness. The Yellow Index number, the total light transmittance and the light diffusion of the plaques are measured.

The Melt Flow Rate (MFR) is measured according to ASTM D 1238-88.

An essential increase in the melt flow rate after the processing of the polycarbonate composition is an indication of a decrease of the average molecular weight of the polymer.

The Yellowness Index number (YI) is measured according to ASTM D 1925-70.

The Yellowness Index number is an indication of discoloration of the polycarbonate composition. The lower the number, the less is the yellowness of the polycarbonate composition due to discoloration.

The total light transmittance and light diffusion are measured according to ASTM D-1003.

Examples 1 to 3 and Comparative Examples A to F were made in one series. Their results are listed in Table I below.

TABLE I

| (Comp.) Example | Light-Diffuser | TPI (ppm) | IRGANOX 1076 (ppm) | PEPQ (ppm) | Melt Flow Rate | Yellowness Index | Total Transmittance (%) | Light Diffusion (%) |
| --- | --- | --- | --- | --- | --- | --- | --- | --- |
| A | I | 1000 | — | — | 4.9 | 8.0 | 64.3 | 53.3 |
| B | I | 2000 | — | — | 5.2 | 8.3 | 64.5 | 53.4 |
| C | I | — | 2000 | — | 4.2 | 8.4 | 63.5 | 52.6 |
| 1 | I | 500 | 1500 | — | 4.6 | 6.7 | 63.7 | 52.7 |
| D | I | — | — | 1000 | 5.9 | 9.0 | 59.7 | 49.2 |
| E | II | 1000 | — | — | 5.0 | 11.6 | 60.9 | 50.3 |
| 2 | II | 500 | 1500 | — | 4.6 | 10.5 | 63.5 | 52.6 |
| F | III | 1000 | — | — | 4.7 | 11.0 | 89.6 | 39.8 |
| 3 | III | 500 | 1500 | — | 4.4 | 9.8 | 91.4 | 39.3 |

The comparison between Example 1 and Comparative Examples A–C illustrates that the combination of a phosphine of formula (I) and a hindered phenol prevents discoloration of a polycarbonate composition much more efficiently that a phosphine of formula (I) alone or a hindered pinenol alone. The Yellowness Index number of the polycarbonate sheet of Example 1 is considerably lower than the Yellowness Index number of the polycarbonate sheets of Comparative Examples A, B and C.

With respect to the Yellowness Index number, the result of comparative Example A is better than the result of comparative Example C. Therefore, the stabilizer compositions in Examples 2 and 3 have been compared with 1000 ppm TPI as a stabilizer. The two comparisons a) between Comparative Example E and Example 2 and b) between Comparative F and Example 3 illustrate that the synergistic effect of the phosphine and the hindered phenol for preventing discoloration is not dependent on the type of organic light diffuser.

In a second series of experiments, Example 4 and Comparative Examples G and H were made. The results are listed in Table II below.

TABLE II

| (Comp.) Example | Light-Diffuser | TPI (ppm) | IRGANOX 1076 (ppm) | PEPQ | Melt Flow Rate | Yellowness Index | Total Transmittance (%) | Light Diffusion (%) |
| --- | --- | --- | --- | --- | --- | --- | --- | --- |
| 4 | I | 500 | 1500 | — | 4.6 | 6.8 | 65.3 | 55.1 |
| G | I | 500 | — | — | 4.7 | 7.7 | 64.8 | 54.3 |
| H | I | 500 | — | 500 | 5.6 | 8.3 | 64.6 | 54.2 |

A comparison between Example 4 and comparative Examples G and H illustrates again the synergistic effect of a phosphine and a hindered phenol in the polycarbonate composition. The polycarbonate plaques produced according to Example 4 has a substantially lower YI number than the polycarbonate plaques produced according to Comparative Examples G and H. A visual inspection of the three polycarbonate sheets clearly shows that the sheet of Example 4 is whiter than the two other sheets. Comparative Example H illustrates that no synergistic effect is achieved when using a combination of triphenylphosphine and a diphosphonite, such as Irgaphos-PEPQ. When triphenylphosphine is used in combination with Irgaphos PEPQ, the produced polycarbonate sheet has even a worse color (i.e., a higher Yellowness Index) than when using triphenylphosphine alone.

In a third series of experiments, Example 5 and comparative Examples I to K were made in the same manner as Examples 1 to 4 except that the used polycarbonate has a melt flow rate of 3.3. The results are listed in Table III below.

TABLE III

| (Comp.) Example | Light-Diffuser | TPI (ppm) | IRGANOX 1076 (ppm) | PEPQ (ppm) | Melt Flow Rate | Yellowness Index | Total Transmittance (%) | Light Diffusion (%) |
| --- | --- | --- | --- | --- | --- | --- | --- | --- |
| I | I | — | 500 | — | 3.9 | 7.5 | 65.0 | 54.5 |
| J | I | — | 1000 | — | 3.9 | 8.1 | 65.6 | 55.0 |
| K | I | — | 1500 | — | 4.0 | 8.1 | 65.2 | 54.7 |
| 5 | I | 500 | 1500 | — | 4.3 | 5.8 | 65.4 | 54.9 |

Table III illustrates that increasing levels of a hindered phenol lead to an increase in yellowness unless it is used in combination with triphenyl phosphine. All plaques produced according to comparative Examples I to K show a substantially higher yellowness index than the plaque produced according to Example 5.

Example 6 and Comparative Example L were made in a separate series but in the same manner as Example 5 and Comparative Examples I to K. In Comparative Example L additionally 1500 ppm of epoxidized soybean oil (ESO) is mixed with the polycarbonate composition and stabilizer composition (similar to the amount in Example 1 of U.S. Pat. No. 4,722,955). The results are listed in Table IV below.

TABLE IV

| (Comp.) Example | Light-Diffuser | TPI (ppm) | IRGANOX 1076 (ppm) | ESO (ppm) | Melt Flow Rate | Yellowness Index | Total Transmittance (%) | Light Diffusion (%) |
| --- | --- | --- | --- | --- | --- | --- | --- | --- |
| L | I | 500 | 1500 | 1500 | 4.3 | 6.3 | 65.8 | 55.2 |
| 6 | I | 500 | 1500 | — | 4.3 | 5.6 | 65.4 | 54.9 |

Visual inspection of the plaques prepared according to Comparative Example L and Example 6 clearly shows that the plaque of Comparative Example L is more yellow.

We claim:

1. A polymer composition comprising a polycarbonate and an essentially epoxide-free stabilizer composition comprising
   a) a phosphine of the general formula $$PR^1R^2R^3 \qquad (I)$$

wherein $R^1$, $R^2$ and $R^3$ independently from each other represent an alkyl, cycloalkyl, aryl or aryl-alkyl group or an aryl group which is substituted at the aromatic ring with one or more halogens and/or one or more alkyl or alkoxy groups and
   b) a hindered phenol.

2. The polymer composition of claim 1 wherein in the general formula I $R^1$, $R^2$ and $R^3$ independently from each other represent an aryl group which is optionally substituted at she aromatic ring with one or more halogens, and/or one or more alkyl or alkoxy groups.

3. The polymer composition of claim 2 wherein the phosphine of the general formula I is triphenylphosphine.

4. The polymer composition of claim 1 wherein the hindered phenol is a compound of formula III

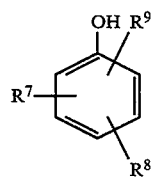

(III)

wherein $R^7$, $R^8$ and $R^9$ are arranged in the ortho and para positions to the hydroxyl group,
$R^7$ is a $C_{1-6}$-alkyl group,
Re is a $C_{1-6}$-alkyl group or a group containing one or more ester, ether, amide, amine, phosphonite, phosphonate, thioester and/or thioether radicals and containing up to 24 carbon atoms and
$R^9$ is a group containing one or more ester, ether, amide, amine, phosphonite, phosphonate, thioester and/or thioether radicals and containing up to 24 carbon atoms.

5. The polymer composition of claim 4 wherein the hindered phenol is octadecyl 3,5-di-tert-butyl-4-hydroxyhydrocinnamate.

6. The polymer composition of claim 1 wherein the weight ratio between the phosphine a) and the hindered phenol b) is from 0.2:1 to 5:1.

7. The polymer composition of claim 1 containing additionally an organic light diffuser.

8. The polymer composition of claim 7 wherein the organic light diffuser is a cross-linked homo- or copolymer containing at least 15 wt.-% of a polymerized, optionally alkylated, acrylate.

9. The polymer composition of claim 1 in the shape of granules or pellets.

10. The polymer composition of claim 3 wherein the hindered phenol is a compound of formula III

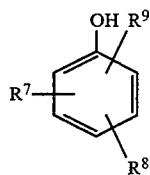

(III)

wherein $R^7$, $R^8$ and $R^9$ are arranged in the ortho and para positions to the hydroxyl group, $R^7$ is a $C_{1-6}$-alkyl group, $R^8$ is a $C_{1-6}$-alkyl group or a group containing one or more ester, ether, amide, amine, phosphonite, phosphonate, thioester and/or thioether radicals and containing up to 24 carbon atoms and $R^9$ is a group containing one or more ester, ether, amide, amine, phosphonite, phosphonate, thioester and/or thioether radicals and containing up to 24 carbon atoms.

11. The polymer composition of claim 10 wherein the hindered phenol is octadecyl 3,5-di-tert-butyl-4-hydroxyhydrocinnamate.

12. The polymer composition of claim 10 wherein the weight ratio between the phosphine a) and the hindered phenol b) is from 0.2:1 to 5:1.

13. The polymer composition of claim 1 wherein the weight ratio between the phosphine a) and the hindered phenol b) is from 0.3:1 to 1:1.

14. A method of stabilizing a polycarbonate against discoloration comprising blending an effective amount of an essentially epoxide-free stabilizer composition comprising a) a phosphine of the general formula $$PR^1R^2R^3 \qquad (I)$$

wherein $R^1$, $R^2$ and $R^3$ independently from each other represent an alkyl, cycloalkyl, aryl or aryl-alkyl group or an aryl group which is substituted at the aromatic ring with one of more halogens and/or one or more alkyl or alkoxy groups and b) a hindered phenol with the polycarbonate and processing the blend into pellets or granules.

15. The method of claim 14 further comprising forming the produced pellets or granules into a shaped article.

16. The method of claim 15 wherein at least one of the steps of i) processing the blend into pellets or granules or ii) forming a shaped article is conducted at a temperature of from 260° to 380° C.

17. A shaped article produced from the polymer composition of any one of claims 1 to 9 or 10 to 13.

* * * * *